United States Patent
Merrison

(10) Patent No.: US 7,341,412 B1
(45) Date of Patent: Mar. 11, 2008

(54) PARKING AND SHIPPING VEHICLE RACKING SYSTEM

(76) Inventor: James Merrison, 36 Clonmel Road, Fulham, London (GB) SW6 5BJ ( * ) Notice: Subject to any disclaimer, the term of this patent is extended or adjusted under 35 U.S.C. 154(b) by 124 days.

(21) Appl. No.: 11/415,911

(22) Filed: May 1, 2006

(51) Int. Cl.
*B60P 7/08* (2006.01)
(52) U.S. Cl. ............................. 410/24; 410/26; 410/30

(58) Field of Classification Search .................. 410/24, 410/26, 30, 15, 4, 19; 414/498; 211/192, 211/195, 208, 85.8; 220/1.5
See application file for complete search history.

(56) References Cited

U.S. PATENT DOCUMENTS

| 2,165,376 A | 7/1939 | Helmer |
| 2,242,891 A | 5/1941 | Light |
| 2,349,389 A | 5/1944 | Thompson |
| 5,199,843 A | 4/1993 | Sferra |
| 5,743,689 A * | 4/1998 | Schlaeger ................... 410/30 |

* cited by examiner

*Primary Examiner*—Stephen Gordon
(74) *Attorney, Agent, or Firm*—Lawrence J. Gibney, Jr.

(57) ABSTRACT

This is a system in which several automobiles can be stowed in a container and secured in place.

9 Claims, 5 Drawing Sheets

PARKING AND SHIPPING VEHICLE RACKING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

This relates to the storage of automobiles in containers. This is sometimes necessary during transoceanic voyages.

B. Prior Art

There are many other storage type systems for automobiles, and they are specifically related to, among other things, parking garages. A representative example of this type of device can be found at Light, U.S. Pat. No. 2,242,891. Another representative example in the prior art is Thompson, U.S. Pat. No. 2,349,389.

Both the Light and the Thompson devices are substantially different than the current application. Light, for instance, uses a storage rack with a series of vertical lifts where one car is stowed directly above the other. In the Thompson device, the automobile is actually lifted off the ground.

The current device is one for stowing or storing more than one automobile in a container.

BRIEF SUMMARY OF THE INVENTION

Sometimes it is necessary to transport an automobile across an ocean. This is typically done either in a ferry or a large container. When it is done in a container, it is sometimes advisable to be able to stow more than one automobile to maximize the cargo carrying capacity in the container. Containers can typically stow only one vehicle. However, if one car or automobile is stowed, there is a great deal of wasted space in the container. This device seeks to maximize the efficiency of the container and utilize all available space.

The front wheels of the automobile that is to be stowed are placed on ramps, which are secured to the bottom of the container. The rear set of wheels on the automobile are positioned in openings in another portion of this device and are elevated by utilizing a forklift. In this manner the first car is tilted upward at an approximate 35 degree angle. As the first car is raised, a space beneath the first car is created and another car can be positioned below a portion of the raised first car.

It is an object of this device to be able to stow two automobiles in a single container. It is a further object to stow the cars in a container to protect them from the elements, particularly on long oceanic voyages.

DETAILED DESCRIPTION OF THE EMBODIMENTS

Figure 1:
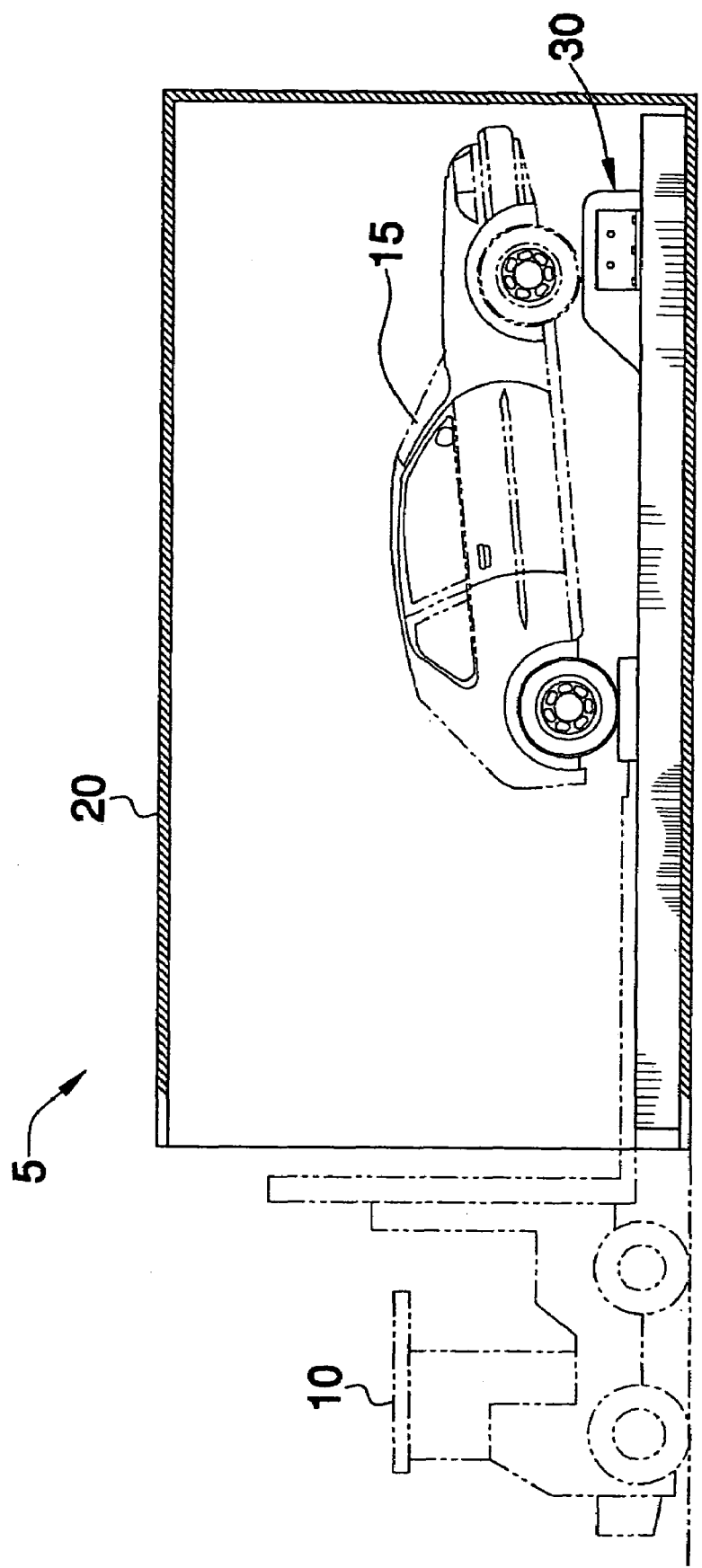
FIG. 1 is a side view of the container, showing the automobile inside the container and the forklift.
Figure 2:
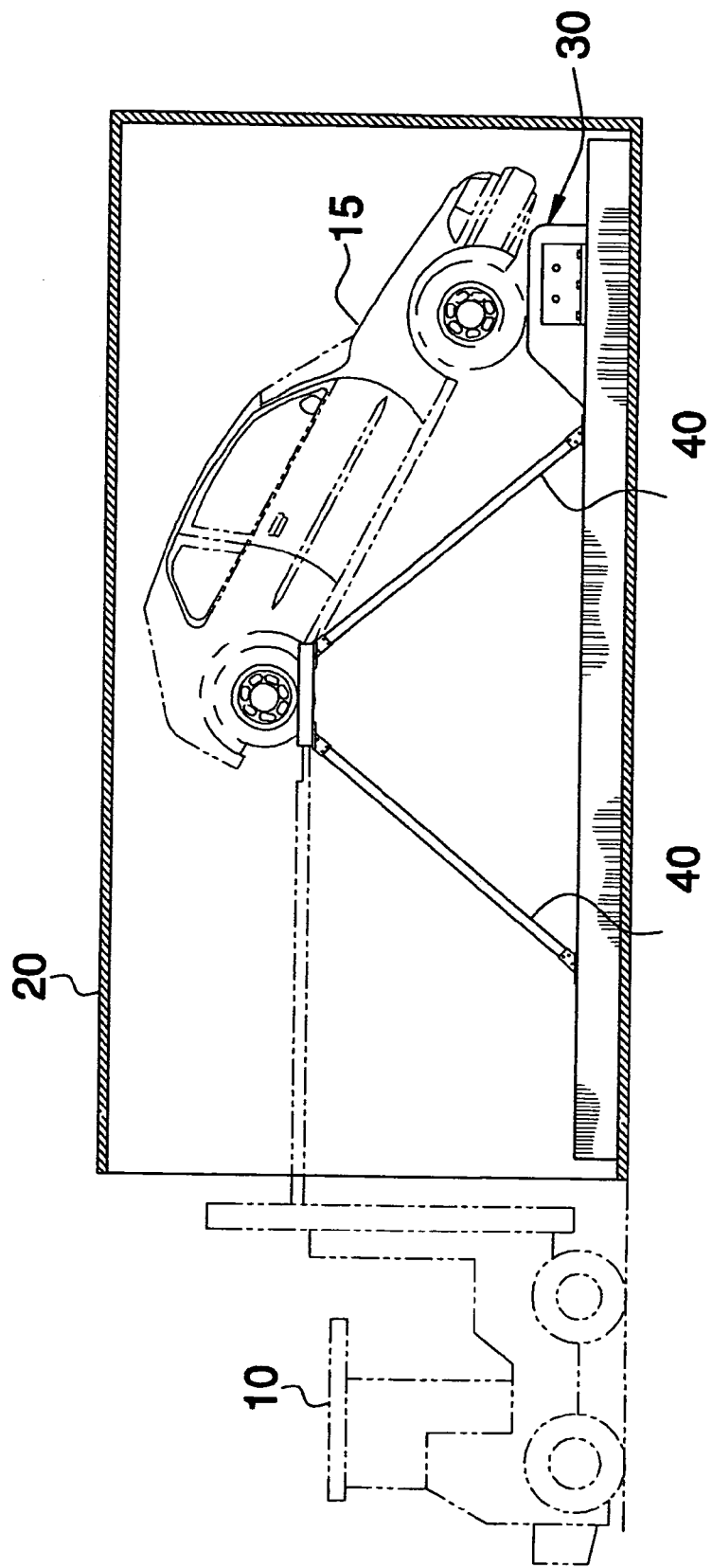
FIG. 2 is a side view of the device with the car inside the container elevated on the device, using the forklift.

This is a device to park and ship vehicles, using a racking or stowing system. Specifically, it will be made so that it can be installed inside a container 20. A container is basically a cubic structure with a large open space into which various types of cargo are stowed for voyages and overland transport. FIGS. 1,2

In operation, the device 5 is comprised of two small ramp structures 30, horizontal support member 35, a plurality of vertical support members 42, lateral support members 40, and a means to connect the vertical support members, lateral support members to the bottom of the container 45.

Figure 4:
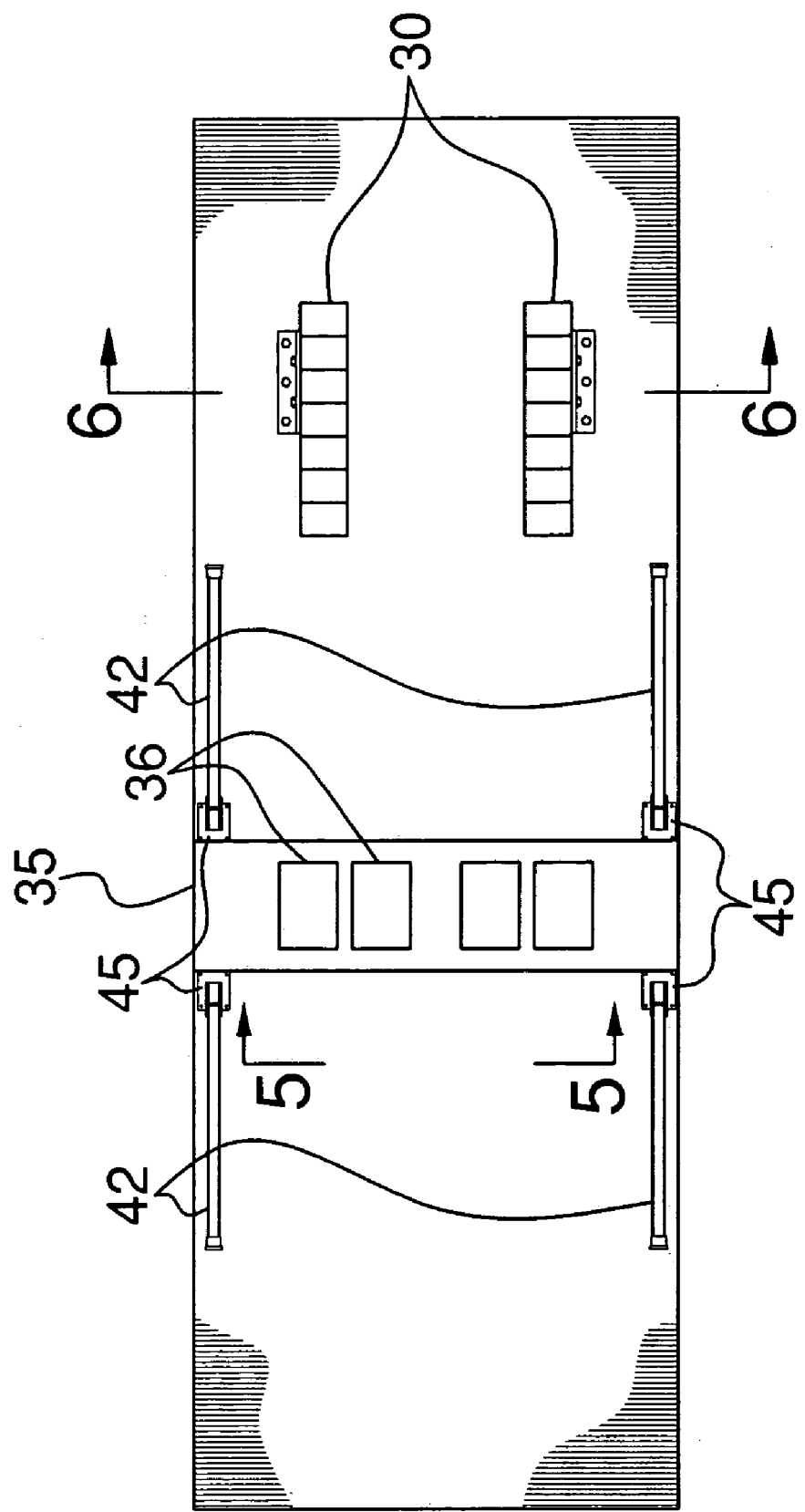
FIG. 4 is a top view of the components of the device.
Figure 5:
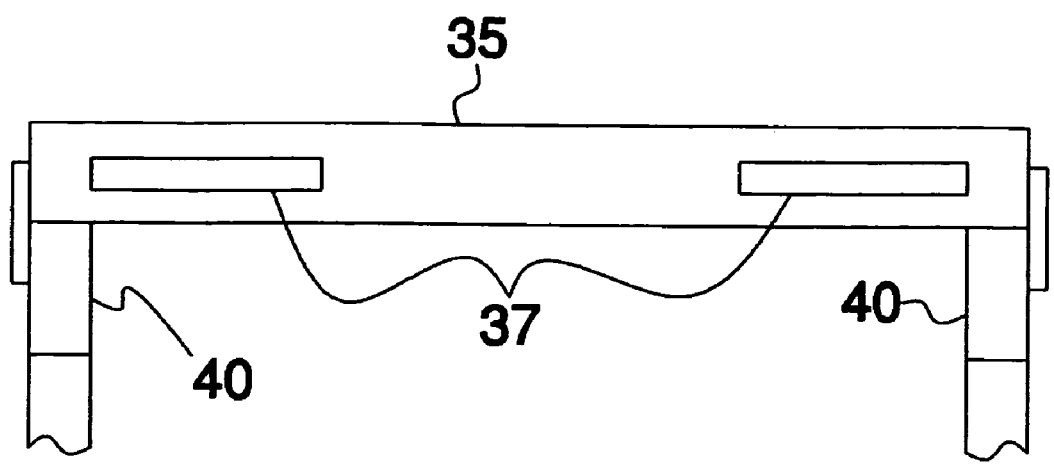
FIG. 5 is a view according to line 5-5 on FIG. 4.
Figure 6:
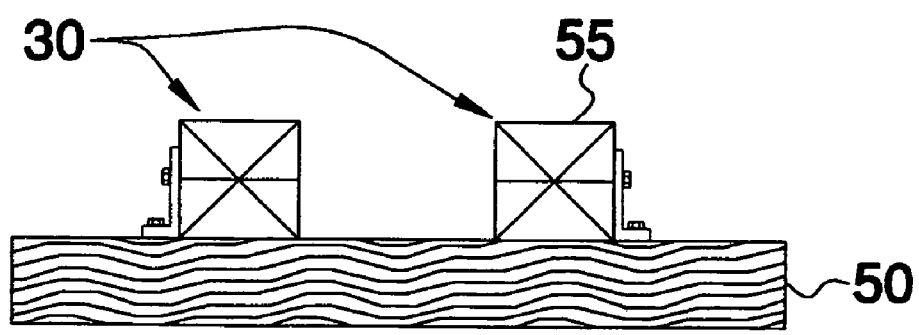
FIG. 6 is a view according to line 6-6 on FIG. 4.

One car 15 is placed inside the interior of the container with the front set of wheels on the ramp 30. The ramp structures are made of metal. The ramps 30 are secured to the bottom of the container using nails. A separate ramp is provided for each front tire. FIG. 4 The rear set of wheels on the car 15 is placed in slots 36 on the horizontal member 35. Because the weight of an automobile must be supported, the use of steel or wood supports are used.

Once the front set of wheels are on the ramp 30 and the rear set of wheels are in the slots 36, a forklift is then used to elevate the horizontal member 35. A pair of slots 37 in the horizontal member 35 are provided into which the blades of a forklift are inserted. These slots 37 enable the forklift to elevate the structure thereby elevating the rear wheels of the first car to enable a second car to fit within the opening that is formed when the horizontal member is elevated. FIGS. 2,4

Figure 3:
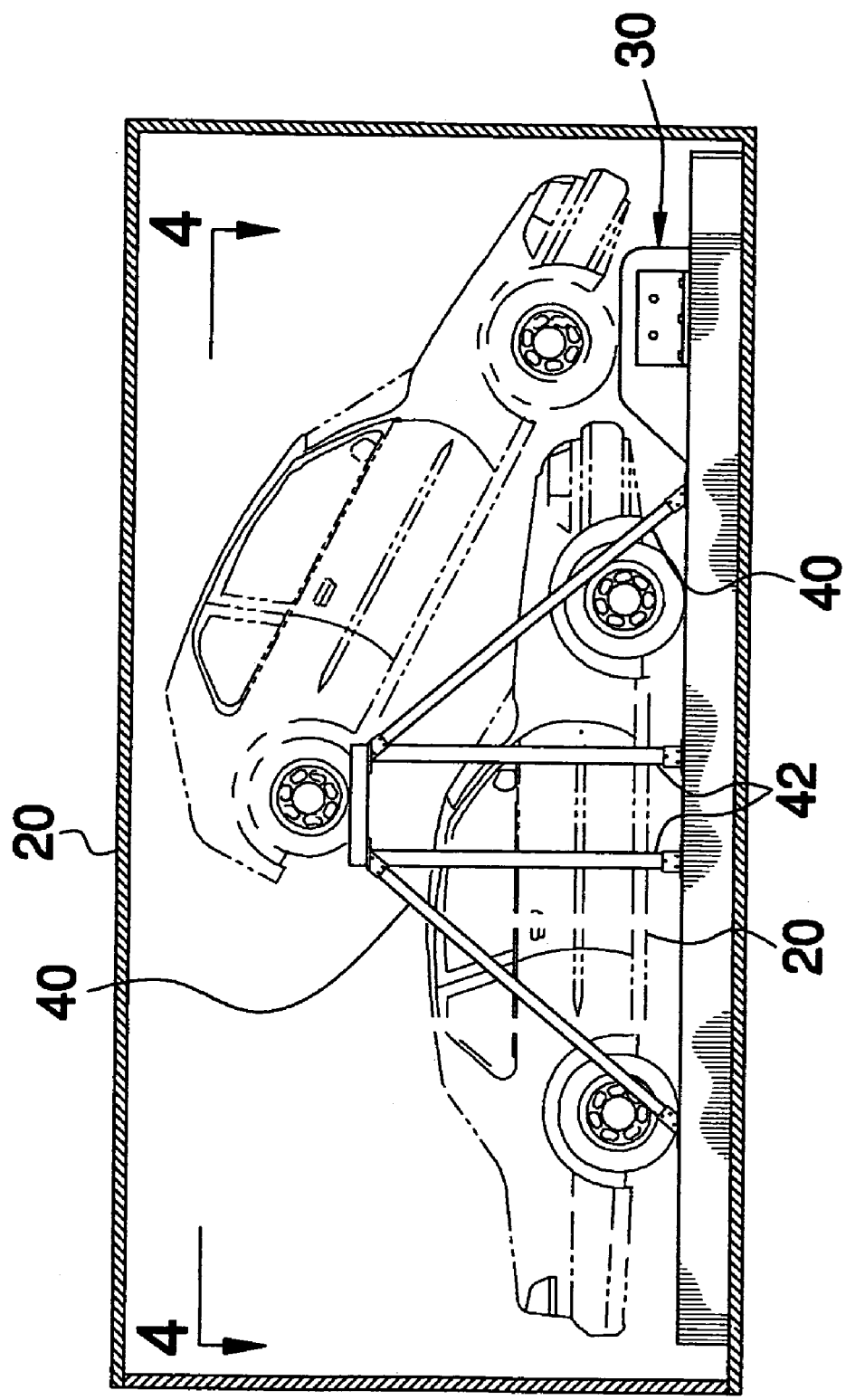
FIG. 3 is a side view of the device, depicting the two automobiles that are stowed and the elements of the device.

After the car has been elevated to a certain distance above the bottom of the container a set of vertical supports members 42, which are connected to the bottom of the container using metal brackets 45, are used to secure the vehicle in position and support the weight of the vehicle. One end of the vertical support member is secured to the bottom of the container and the other is secured to the underside of the horizontal member 35. FIG. 3 The vertical support members 42 are designed to rotate from the bottom of the container into position. The vertical support members 42 can be constructed from a variety of materials including but not limited to steel, wood or aluminum. The connection means will be a series of brackets 45 that are secured to the bottom of the container using screws or nails. Such connection means are common in the prior art. FIG. 4

Once the car is elevated and the vertical supports members 42 are in place lateral support members 40 can be installed for additional security. The lateral supports members 40 can be ropes or straps as well as pieces of wood stock. If ropes or straps are used they are tightened using a tourniquet where a piece of wood is twisted in the rope to tighten it. One end of the lateral support members 40 is secured to the bottom of the container probably using a set of rings and screws or nails and the other is secured to the underside of the horizontal support member 35 at an acute angle.

Once the vertical support members 42 and the lateral support members 40 are in position, an additional car may be secured in the container as depicted in FIG. 3.

Although not specifically depicted, a means of securing the vehicle to the ramps, horizontal member and container will also be employed. This will be necessary to prevent excessive shifting of the cars in the container. Such means may include chains, turnbuckles and straps and these types of method to secure the cargo are commonly found in the prior art.

The inventor claims:

1. A parking and shipping vehicle racking system that is comprised of:
   a. a container;
   wherein the container is used to stow vehicles;
   wherein the container is a cubic structure;
   b. a set of ramps;
   wherein the ramps are securely fastened to the bottom of the container;
   wherein the ramps are comprised of a steel structure;
   wherein tires of one of the vehicles is placed on the ramps;
   c. a horizontal member;
   wherein the horizontal member is provided to elevate a vehicle at an angle within the container;
   said horizontal member has openings for a wheel of a vehicle;
   said horizontal member has a plurality of slots for forklift blades;
   d. vertical support members;
   wherein a plurality of said vertical support members support the weight of one of the vehicles in the container;
   said vertical support members have a first end and a second end;
   wherein the first end of the vertical support members is secured to the bottom of the container;
   wherein the second end of the vertical support members is positioned on the underside of the horizontal member;
   e. lateral support members;
   wherein a plurality of said lateral support members support the weight of one of the vehicles in the container;
   said lateral support members have a first end and a second end;
   wherein the lateral support members are secured to the container at their first end and to the underside of the horizontal member at their second end.

2. The device as described in claim 1 wherein the horizontal member is manufactured from steel.

3. The device as described in claim 1 wherein there are a plurality of said openings in the horizontal member.

4. The device as described in claim 1 wherein each vertical support member is manufactured from steel or wood.

5. The device as described in claim 1 wherein each lateral support member is manufactured from steel.

6. The device as described in claim 1 wherein the ramps are secured to the bottom of the container by screws.

7. The device as described in claim 1 wherein the lateral support members are secured to the bottom of the container by rings that are nailed or screwed.

8. The device as described in claim 1 wherein the lateral support members are a set of ropes.

9. The device as described in claim 1 wherein the lateral support members are a set of straps.

* * * * *